United States Patent [19] [11] 4,131,172
Wolfgram [45] Dec. 26, 1978

[54] ACCESS PANEL FOR ENCLOSURES
[75] Inventor: Kenneth C. Wolfgram, Aurora, Ill.
[73] Assignee: Caterpillar Tractor Co., Peoria, Ill.
[21] Appl. No.: 814,593
[22] Filed: Jul. 11, 1977
[51] Int. Cl.² .............................................. B62D 25/10
[52] U.S. Cl. .................................. 180/69 R; 16/128.1; 160/213
[58] Field of Search ........................... 180/69 R, 54 A; 160/213, 212; 16/128.1; 296/76

[56] References Cited
U.S. PATENT DOCUMENTS

| 742,319 | 10/1903 | Heinzelman | 160/212 |
|---|---|---|---|
| 1,113,320 | 10/1914 | Feagan | 180/69 R X |
| 1,316,579 | 9/1919 | Kehoe | 180/69 R |
| 2,089,504 | 8/1937 | Reynolds | 180/69 R X |
| 2,743,773 | 5/1956 | Weiertz | 160/213 |
| 2,765,189 | 10/1956 | Forssell | 160/213 X |
| 2,794,511 | 6/1957 | Mackie | 180/69 R |

Primary Examiner—Joseph F. Peters, Jr.
Assistant Examiner—Milton L. Smith
Attorney, Agent, or Firm—Sixbey, Bradford & Leedom

[57] ABSTRACT

An access panel for enclosures, operable to selectively close or open an access opening, such as in an engine compartment of an engine enclosure assembly, the panel including a pair of separate sections hingedly adjacently interconnected to form a composite unit, the composite unit being operatively hingedly mounted proximate the access opening, and the individual sections being so pivotally angularly movable with respect to one another as to permit an optimum access opening in restricted or obstructed locations of the access opening.

14 Claims, 6 Drawing Figures

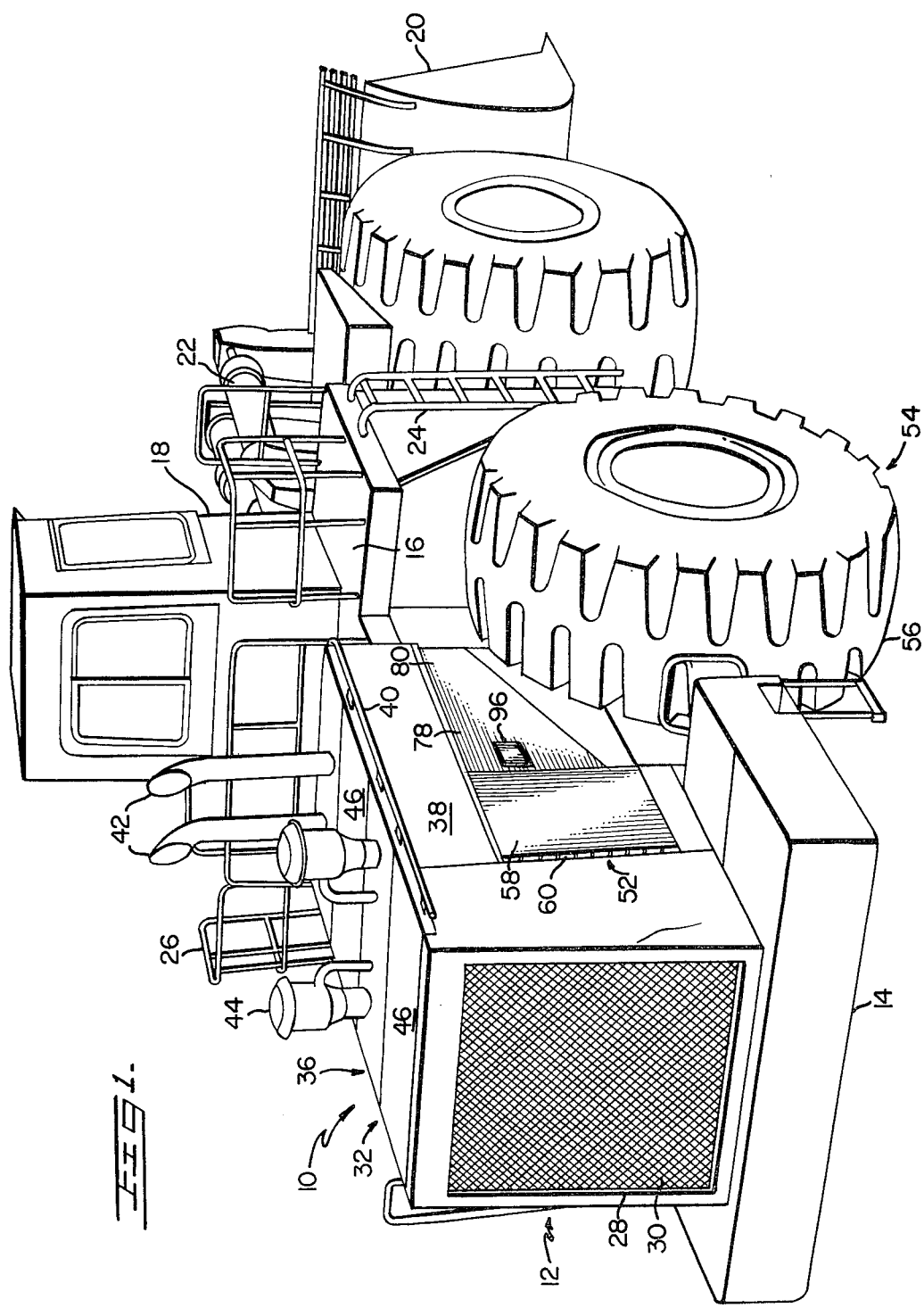

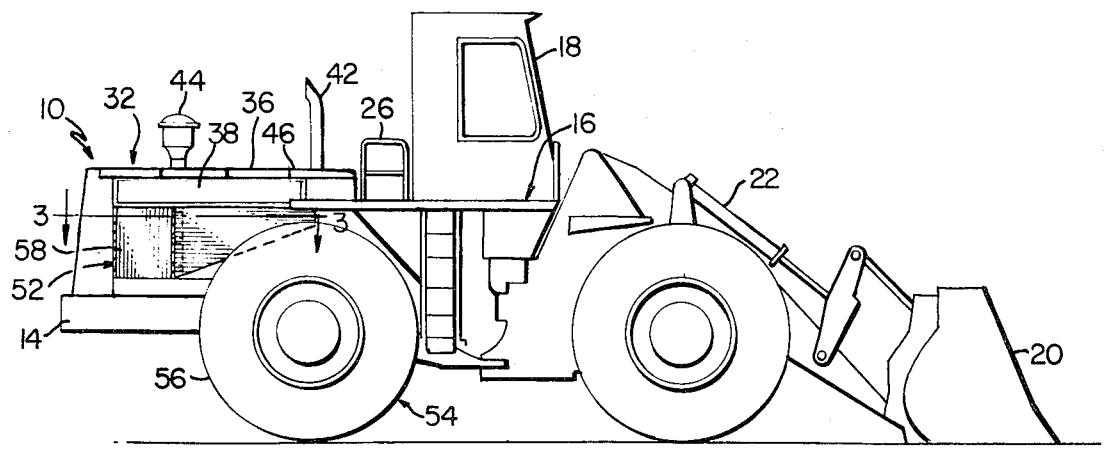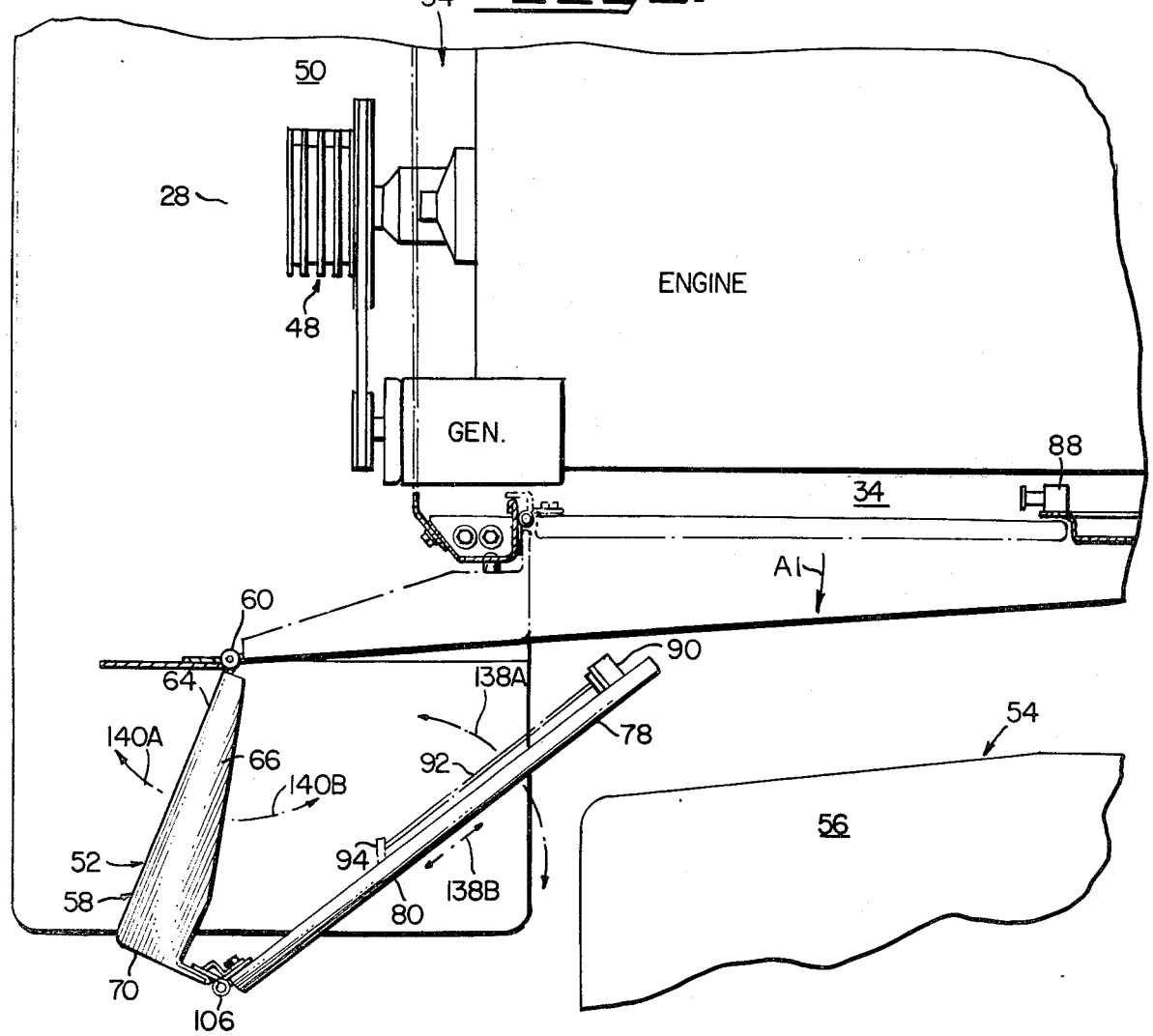

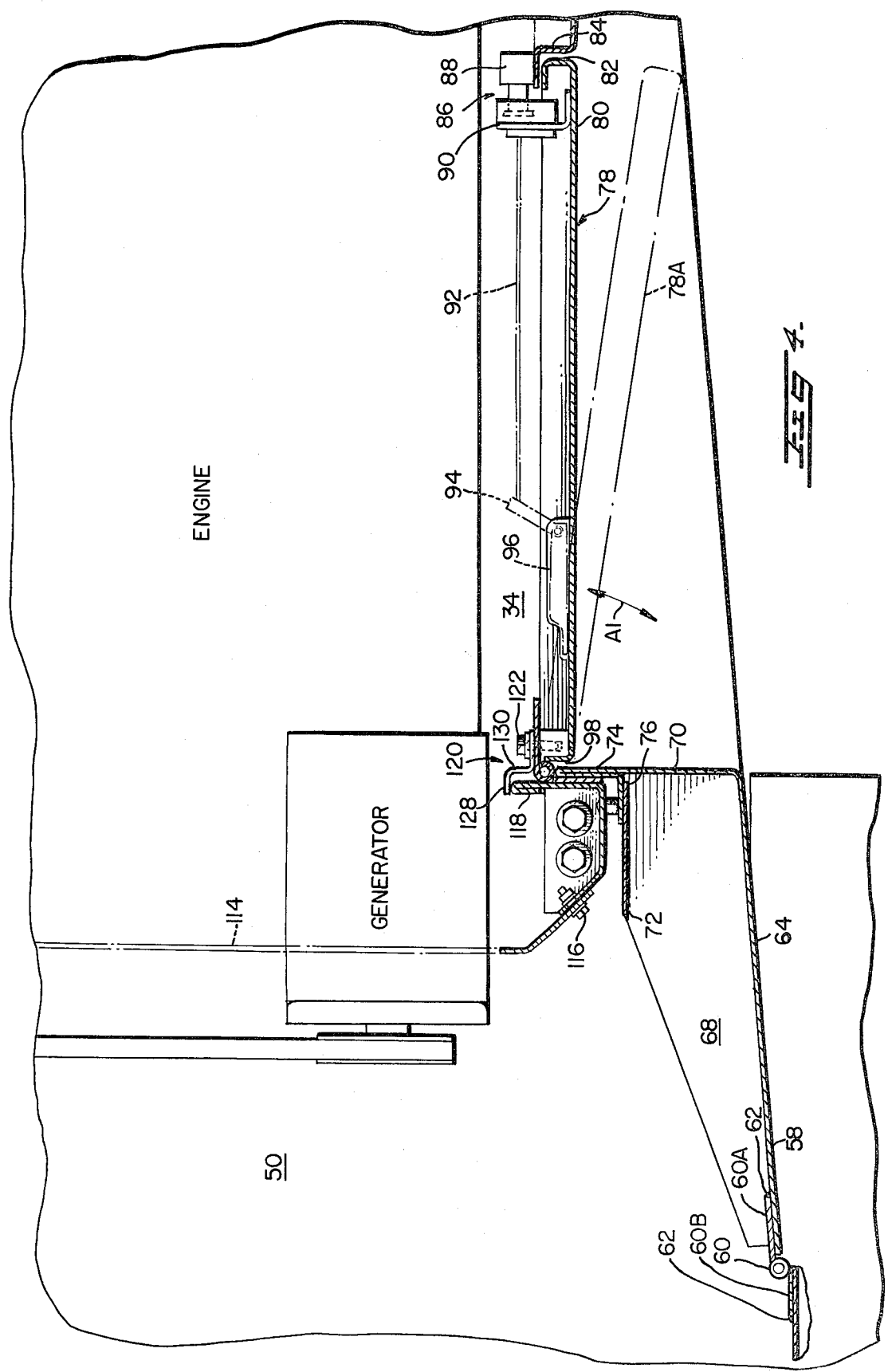

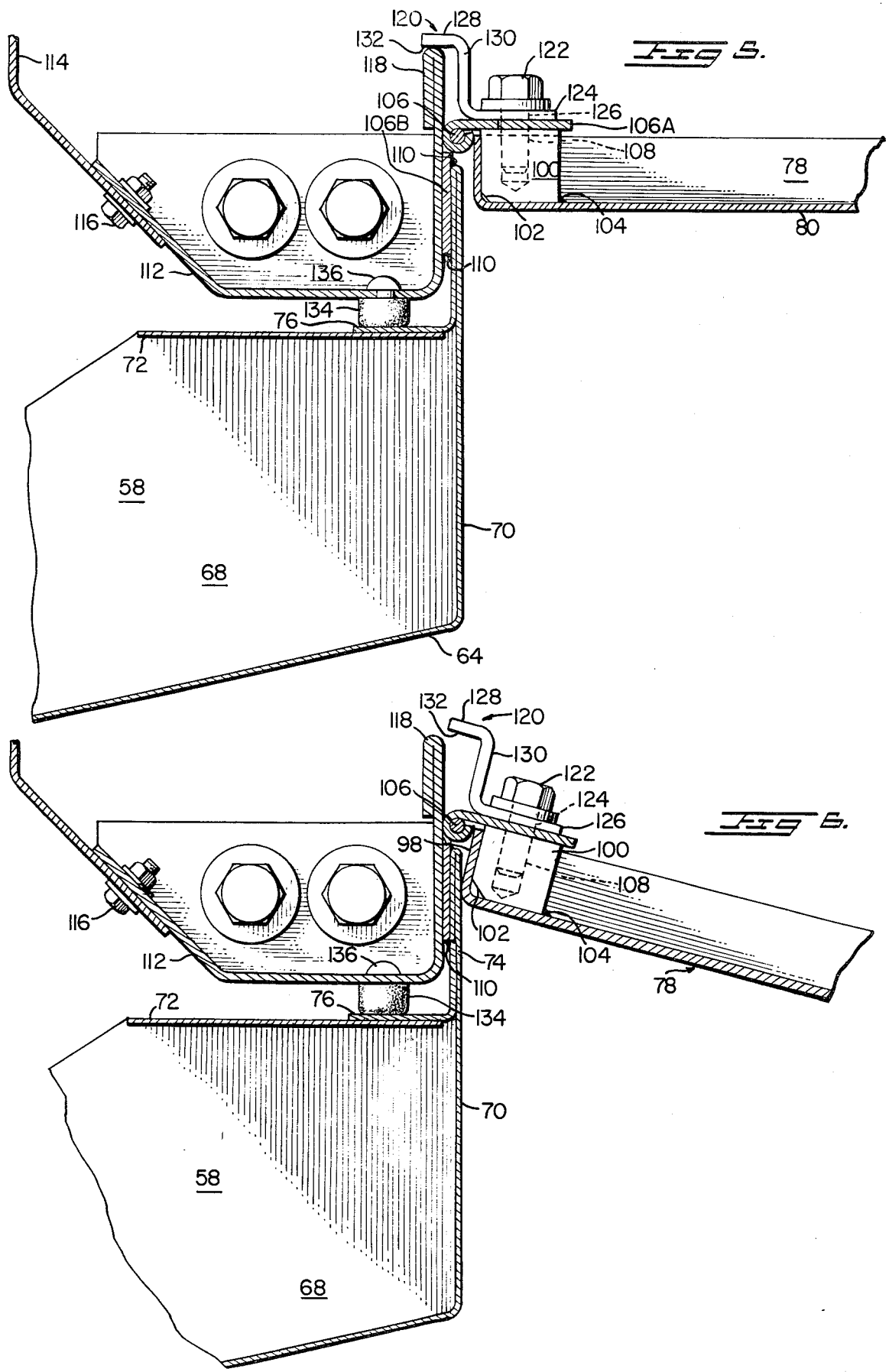

ACCESS PANEL FOR ENCLOSURES

BACKGROUND OF THE INVENTION

This invention relates broadly to an access panel for enclosures which is operable to selectively close or open an access opening to an optimum extent, even though the enclosure and access opening are in a restricted or obstructed location. The access opening is suitable for any type of enclosure, and the invention is operable in top, side and bottom locations of the enclosure, or other environments where access is necessary or desired. The invention has particular usage however where such access is difficult, or restricted to partial openings due to a confined operating space or area, or where access is impeded by structure, environment, etc.

More specifically the invention is applicable for use in connection with a vehicle engine enclosure assembly such as in construction, earth working, etc. vehicles, including but certainly not limited to wheeled front end loaders, wheel loaders generally, wheel dozers, wheeled compactors, sanitary land fill compactors, and the like. Normally in vehicles of these types it is desired to prevent dust, dirt and the like from entering the engine enclosure, such materials presenting a possibility of affecting operation and possibly causing long term or time deterioration.

Engines utilized in such vehicles, generally speaking, are noisy. It is desirable accordingly, as applied to engine enclosure assemblies, to provide a cover which is not only useful in combating dirt, dust, rain, or other external matter that could damage or affect operation and/or the mechanism per se, but also can serve as noise diminution means, and will increase personnel safety by barring contact with mechanisms. Further the closures are used for such engine enclosure assemblies for aesthetic reasons, such as presenting clean external lines, and combining mechanisms otherwise tending to extend externally of the engine compartment.

More specifically the invention relates to an access panel in an engine enclosure assembly, wherein hinged panel means are utilized to expose selectively a portion of the engine compartment, the panel having two hinged areas or sections so that a complete panel can be hinged open from behind an obstruction such as a vehicle wheel, one hinge including a means to securely clamp the panel assembly in place, the clamp means engaging a stationary post and having a compressible bumper in the nature of rubber thereon, the clamp means functioning for compressing the bumper to thereby securely position the complete panel assembly, in conjunction with an additional latch or locking means.

A very substantial problem has also been encountered in certain types of vehicles in that access panel removal from the engine enclosure was restricted due to interference by vehicle rear wheels and tires for example, with the restriction incurring additional time factors to obtain access, and difficulties arose through size, weight, and physical access to such panels. It is desirable that a larger proportion of the side, for example, of an engine compartment be made available for service access and/or maintenance work.

DESCRIPTION OF THE PRIOR ART

Heretofore, particularly with reference to an engine enclosure assembly in wheeled vehicles of the earth moving, construction, etc. type, enclosure panels were provided for elimination of, insofar as possible, entrance of deleterious materials into an engine enclosure, and additionally panels incorporating sound diminution means have been employed. Such panels however were normally quite sizeable and bolted over an access opening to the engine compartment. Such panels were heavy, difficult for personnel to manage, did not present pleasing aesthetic appearances to the vehicle due to external extension of fastening means, and such panels when removed were frequently mislaid or subject to possible damage.

In many such previously known constructions, large access panels in the nature of metal sheets were used which in most circumstances required bolting on, and due to size and restricted work areas, could not be maneuvered or manipulated as desired to provide optimum access to the interior of the engine compartment.

In many vehicles such access panels were mounted in areas partially located behind wheels of a wheeled vehicle, and actual access to the panels was not only difficult but the actual access opening was limited due to a restriction in operating space.

The assignee company of the inventor has for a long period of time been in the field of design, manufacture, sale and maintenance of heavy equipment of earth working or construction types, and the problem of access to engine compartments has been in existence for a long period of time. The company, while having been aware of existing constructions, has for a long period of time desired an innovation or change from the old style, such as the use of bolted on panels, in order to overcome the difficulties thereby encountered.

SUMMARY OF THE INVENTION

The present invention accordingly is directed basically to providing in an engine enclosure assembly, hinged panel means utilized to expose a portion of the engine compartment, the panel including two hinged panel portions or sections or areas, so that a composite complete panel is formed, and which can be hinged open from behind an obstruction such as a wheel, one hinge having a means to securely clamp the composite panel assembly in place, the clamp means being operable to engage a stationary post, such as a noise wall post, with compressible bumper means on the post, the bumper means being compressed with the panel closed to lock the panel in closed condition.

The features of the invention result in structural integrity, ease of operation, an optimum working access opening, an aesthetically pleasing appearance, safety, and generally and specifically overcome known drawbacks of prior art structures. The overall results are a very substantial advance and contribution to the pertinent area of interest.

Additional objects, features and advantages of the invention will be more readily apparent from the following detailed description of an embodiment thereof, when taken together with the accompanying drawings in which:

FIG. 1 is a perspective view of a front end loader incorporating the invention;

FIG. 2 is a side elevational view of the vehicle of FIG. 1;

FIG. 3 is an enlarged fragmentary view, disclosing in greater detail the access panel as applied to the vehicle of FIGS. 1 and 2, with the access panel being shown in a partially, almost complete, open position, the view being taken along line 3—3 of FIG. 2;

FIG. 4 is an enlarged fragmentary view similar to FIG. 3, with the access panel being shown partly in section for clarity of details, and with the access panel shown in a partly open position in broken lines;

FIG. 5 is a further enlarged detailed sectional view of one panel hinge area, and showing a panel securement clamp in a closed condition; and FIG. 6 is a view similar to FIG. 5, with the panel securement clamp in open condition, permitting movement of the composite access panel to an open position shown in FIG. 3, the arrows in FIGS. 3 and 4 indicating movement of the panel sections in opening and closing directions.

DETAILED DESCRIPTION

Referring now in detail to the drawings, there is shown in FIG. 1, and generally designated 10, a wheeled or front end loader which includes an engine compartment assembly 12, a bumper 14, an operators platform 16, an operators cab 18, a bucket 20 of a general and known type operable through hydraulic piston and cylinder means 22, an access ladder to the operators platform 24, and guard or hand rails 26. All of the foregoing structure is of a usual known construction in a field in which the assignee of this application and the present inventor have been occupied over a substantial period of time.

The present invention, as hereinbefore pointed out, is directed to an access means assembly to the engine compartment of an engine enclosure assembly. The engine enclosure assembly 10 includes, as seen in FIG. 1, a radiator 28 with a front perforated grill 30 positioned at the end of the engine compartment, which latter is externally generally designated at 32. The internal portion of the compartment is indicated at 34. The engine compartment assembly includes the usual top wall 36, and sidewalls 38, only one of which is shown in the drawings. A hand rail 40 is provided, and the top includes openings for mounting exhaust pipes 42 and filters or the like 44.

The top 36 normally includes a plurality of cover sections 46, secured to the hood in any desired manner, and which can selectively be removed to provide access to the engine in the engine compartment. The engine is fragmentarily shown in the Figures, as also a generator, and a belt and pulley assembly generally indicated at 48, and which is positioned in the radiator area 50. As is well known an operating engine and controls therefor include many more structural attachments and the like, not shown, and access thereto for normal and usual maintenance, as well as repair, is a requirement. The present invention is more specifically directed to an access assembly in the nature of a composite access panel incorporated in the sidewall 38 of the engine compartment housing, this access panel assembly being generally indicated at 52. As will be seen from an inspection of FIG. 2, the rear wheel and tire assembly 54, and especially the tire 56, extend partially over this access panel assembly 52 which, as pointed out hereinbefore, caused difficulties in attaining optimum or desired access into the engine compartment. This, also as pointed out hereinbefore, was exaggerated when single large panels in the nature of sheets were used to close the access opening therebehind. This problem, to a substantial extent, is overcome and remedied by the access panel assembly of the present invention.

The access panel assembly 52 includes a first panel section 58 hingedly connected to the rear of the radiator shroud or cover by a piano type hinge 60, which extends the complete vertical height of the panel section in order to provide structural strength. One hinge half 60A is connected to the interior of the first panel, and the other hinge half 60B is connected by welding, the weld areas being indicated at 62, to the radiator cover or shroud. Referring to FIGS. 3 and 4, the first panel section 58, which is formed of sheet metal, includes an external vertical side 64, a top panel 66, a bottom panel 68, a rear panel or sheet 70, and an internal side panel 72. These various sides and/or panels are all formed of sheet metal in a usual manner, of sufficient strength and rigidity, and may be solid or perforated to facilitate air flow and/or serve as noise deadening baffles in a known manner. The rear panel 70 is folded over or doubled on itself to form a doubled wall or panel portion 74 (FIG. 4) with an end 76 thereof being bent at a forwardly extending angle, and which is affixed to the internal side panel 72 by welding.

A second panel section 78, of access panel assembly 52, is shown in detail in FIG. 4. This consists of an exterior vertical sheet or panel 80 of metal of an appropriate thickness and strength etc., and has a rear edge 82 of a generally U-shaped configuration adapted for coacting with a jamb 84 of coacting configuration. A panel latch assembly, schematically indicated at 86, is in the nature of a locking mechanism, one portion of which, 88, is affixed to jamb 84, and the other portion 90 is attached to the interior of panel 80. An actuating rod 92 extends from lock portion 90 to a pivoted lever 94 which is operatively attached to a recessed flush type handle mechanism 96, operatively mounted in the panel 80, the function or operation of which will be detailed hereinafter.

The forward end 98 of the second panel section is bent at an inward directed angle from the panel 80. As shown in greater detail in FIGS. 5 and 6 the angle formed between panel 80 and the inward turned flange or forward end 98 has a metal block or bar 100 positioned therein. The bar has a chamfer at 102 to permit better mating engagement in the corner with respect to the internal surfaces of the sheet, and the bar is welded to panel 80 as at 104. The function and purpose of this bar, which extends vertically substantially over the extent of the panel 80 from top to bottom, is to provide, in conjunction with other structural features, a structural integrity and strength to hinge mounting means for the second panel, and for locking or clamping means for the overall panel assembly.

A second piano hinge 106 has one half 106A welded to the bar 100, and is provided with a plurality of holes or openings therethrough in alignment with threaded bores 108 in vertically spaced arrangement in the bar. The other half of the hinge, 106B, is welded to the interior side of the doubled wall end portion 74 of the first panel, the weld being indicated at 110.

The vehicle structure includes a vertically mounted noise wall post 112, in a usual manner, and to which a noise wall 114 is attached by nuts and bolts 116. Bolts or cap screws mount the noise wall post to the frame structure of the vehicle, not shown. The rear end of the noise wall post 112 is doubled back upon itself as shown at 118. A plurality of locking clamp means, generally designated 120, are mounted to the hinge half 106A and bar 100 by means of bolts 122 which extend through holes 124 in the web 126 of the clamping means, to integrate and provide structural integrity to the hinge mount of the second panel. A second web portion 128 of locking clamp means 120 is substantially parallel to web 126, with an interconnecting leg 130. The web 128 serves functionally in the nature of a cam, having a camming face 132 adapted for engagement on the folded over rear edge 118 of noise wall post 112, as will be detailed hereinafter. A plurality of compression pads in the nature of rubber bumpers, grommets or the like, 134, are vertically spacedly connected at 136 (see FIG. 6) to the exterior of noise wall post 112, and are adapted for compression engagement with and between the post and the end 76 of doubled portion 74 of panel 70.

The operation of the so-described access panel assembly is such as to permit an optimum access opening into the engine assembly enclosure. This is accomplished due to the panel assembly having two hinged areas so that the complete panel can be hinged open from behind the wheel or tire 56, as shown in FIG. 3 for example. The second hinge 106 has the means 120, in the nature of a clamping hook operable, in conjunction with the end of the noise wall post 118, to securely clamp the panel assembly in place. The clamp means, in effecting this function, engage the stationary post in a camming type of action and this clamp means, and camming action, compress the bumper elements 134 between the noise post and the interior of the first panel 58, and in conjunction with locking mechanism assembly 86, securely position the complete panel assembly, and prevent undesired opening.

The structure, arrangement, and interconnection of the various portions provide a sturdy structure having strength characteristics necessary in vehicles of this type. The structure is such that the panels are always attached to the machine, and not susceptible of being mislaid as the access opening is bared for work within the compartment. A larger portion of the side of the engine compartment is available for access to the interior for service work and a clean appearance of the machine side is provided due to absence of visible cap screw heads or the like. The arrangement of the hinges between the radiator guard and side panels, and between the side panel portions, provides the desired end result.

The composite panel, therefore, includes unique structure and operational possibilities in the use of a tab or hook on one panel section to lock the second panel section in place when the first panel section is closed. The locking tab engages behind the noise wall post, and stabilizes the hinge between the two panels. The principal of using the double hinge structure is in some respects similar to a bifold arrangement used for example in closet doors.

Referring to FIG. 4, the access panel assembly is shown in full lines in the closed position. The broken line showing at 78A is a first stop in opening of the assembly, accomplished by engaging handle 96 and pulling thereon, which, through lever 94 and rod 92 disengages or unlocks the lock mechanism 90, and moves the panel 78 to the position shown at 78A as indicated by arrow A-1. In so doing the locking clamp means has the nose or cam portion 132 disengaged from edge 118, i.e., from the position shown in FIG. 5 to the position shown in FIG. 6. This disengagement, against the compressive force of the cam and the rubber bumpers, permits the second panel section 78 to move with a compound movement, as indicated by broken line arrows 138A and 138B in FIG. 3, due to the hinge structure 106 interconnecting the first and second panels. Conjointly therewith is movement of the first panel section 58 as indicated by the broken line arrow 140A to a panel open position, and by arrow 140B to a panel closed position.

It is believed that the opening and closing of the compound or multiple section access panel assembly will be clearly understood from the foregoing, and the structure in operation clearly provides the desirable end results as hereinbefore delineated.

Manifestly minor changes in details of construction can be effected in the structure as shown and described without departing from the spirit and scope of the invention as defined in, and limited solely by, the appended claims.

I claim:

1. In a wheeled vehicle having an engine compartment, an enclosure for said compartment including a top wall and a vertically disposed side wall, an access opening for said compartment in said side wall, access to said opening being impeded by positionment partially behind an obstructing wheel of said vehicle, an access panel for selectively closing or opening said access opening, said access panel including a first panel section and a second panel section, said panel sections being vertically hingedly adjacently interconnected and forming a composite unit with the sections being pivotal with respect to one another, vertical hinge means at one end of said composite unit hingedly connecting said composite unit proximate said opening and pivotally mounting said first panel section for pivoting about a vertical axis with respect to said opening, and additionally pivotally mounting said composite unit for pivoting about a vertical axis with respect to said opening, the plural pivotal relationships permitting a compound pivotal movement of the individual sections with respect to one another, and of the compound unit to move said access panel in a plane horizontally from behind said obstructing wheel for optimally uncovering said access opening in the restricted operating area behind the access impeding wheel.

2. An access panel as claimed in claim 1, including a hinge inter-connecting said panel sections and being of an extended type covering substantially the length of the hinged connection between said panel sections, said hinge including a clamp means to securely clamp the panel assembly in place in said opening in a closed position thereof, a stationary post positioned proximate the hinged mounting of the composite unit, said clamp being operatively engageable with a portion of said post to cam said second panel section, and conjointly therewith said first panel section, into a securely closed position in said access opening.

3. An access panel as claimed in claim 2, and including a compressible bumper means between said post and said camming means, the clamp means functioning upon camming on said post for compressing the bumper to thereby securely resiliently position the complete panel assembly in closed position.

4. An access panel for selectively closing or opening a partially obstructed access opening in a compartment, said access panel including a first panel section and a second panel section, said panel sections being hingedly adjacently interconnected and forming a composite unit with the sections being pivotal with respect to one another, one end of said composite unit being hingedly connected proximate said opening and thereby pivotally mounting said first panel section with respect to said opening, and additionally pivotally mounting said composite unit with respect to said opening, the hinge interconnecting said panel sections being of an extended type covering substantially the length of the hinged connection between said panel sections, the plural pivotal relationships permitting a compound movement of the individual sections and the compound unit to move said access panel for optimally uncovering said partially obstructed access opening, the interconnecting hinge including a clamp means to securely clamp the panel assembly in place in said opening in a closed position thereof, a stationary post positioned proximate the hinged mounting of the composite unit, said clamp being operatively engagable with a portion of said post to cam said second panel section, and conjointly therewith said first panel section, into a closed position in said access opening, and a compressible bumper means between said post and said camming means, the clamp means functioning upon camming on said post for compressing the bumper to thereby securely resiliently position the complete panel assembly in closed position.

5. An access panel as claimed in claim 4 and further including a locking means having a first portion thereof mounted adjacent said access opening in said compartment, proximate the free end of said second panel section in closed position, and a second coacting portion of said locking means attached to said free end of said second panel section, said locking portions being operable in conjunction with said clamp means for securing said composite panel in closed position.

6. An access panel as claimed in claim 5, further including handle means operatively mounted on said second panel section, lever means extending from said handle means to said second portion, and being operable to disengage the locking means in the respective lock portions, for disengagement of said locking means to permit a first pivoting motion of said second panel section to disengage said clamping means whereupon the composite access panel can be pivoted into open position in compound movement with said second panel section pivoting with respect to said first panel section, and said first panel section conjointly with said first panel section pivoting around said hinge mounting said composite unit.

7. In an engine enclosure assembly for a wheeled vehicle, an engine compartment, an acccess opening for said engine compartment partially obstructed behind a wheel of said vehicle, hinged composite panel means operable to expose a portion of said engine compartment, said hinged composite panel means including two interconnectedly hinged sections, means hingedly mounting said composite panel means adjacent said access opening, the multiple hinges permitting hinging open the composite panel from behind the obstructing wheel, a stationary post on said vehicle proximate said access opening, resilient bumper means on said post, the hinge between said sections having clamping means thereon cooperable with said resilient bumper means to compress the same and to securely clamp the panel assembly in securely closed position.

8. In an engine enclosure assembly as claimed in claim 7, said clamping means including a hook shaped locking tab affixed thereon, said tab, upon pivoting of the free end panel section causing a camming action of said tab on an edge of the hingedly mounted panel section to thereby compress said bumper means and forcefully secure the panel assembly in closed position.

9. In an engine enclosure assembly as claimed in claim 8, and further including a locking means having a first portion thereof mounted adjacent said access opening in said compartment, proximate the free end of a second said panel section in closed position, and a second coacting portion of said locking means attached to said free end of said second panel section, said locking portions being operable in conjunction with said clamp means for securing said composite panel in closed position.

10. In an engine enclosure assembly as claimed in claim 9, further including handle means operatively mounted on said second panel section, lever means extending from said handle means to said second portion, and being operable to disengage the locking means in the respective lock portions, for disengagement of said locking means to permit a first pivoting motion of said second panel section to disengage said clamping means, whereupon the composite access panel can be pivoted into open position in compound movement with said second panel section pivoting with respect to said first panel section, and said first panel section conjointly with said first panel section pivoting around said hinge mounting said composite unit.

11. In an engine enclosure assembly for a wheeled vehicle, an engine compartment, an access opening for said engine compartment, said access opening being partially obstructed by partial positionment behind a wheel of said vehicle, a composite access panel for selectively closing or opening said access opening, said access panel comprising first and second acces panel sections, first hinge means pivotally mounting an end of said first panel section to said engine enclosure adjacent an end of said access opening, second hinge means pivotally interconnecting said first and second panel sections, a stationary post mounted on said vehicle proximate said access opening and having an extended edge thereon, resilient bumper means mounted on said post and engageable by said first panel section in closed position of said composite panel, clamping means including a hook shaped member attached to said second hinge means and being engageable with said extended edge on said post in a pivoting closing movement of said second panel section with respect to said first section and of said access panel, and operable to compress said bumper to securely clamp the panel assembly in closed position.

12. In an engine enclosure assembly as claimed in claim 11, the multiple hinges permitting pivoting of said second panel section with respect to said first panel section, and pivoting of said composite access panel with respect to said access opening, the multiple hinges permitting hinging open the composite panel from behind the obstructing wheel by compound motions of said panel sections and of said composite access panel to thereby provide optimal opening of said access opening.

13. In an engine enclosure assembly as claimed in claim 12, and further including a locking means having a first portin thereof mounted adjacent said access opening in said compartment, proximate the free end of said second panel section in closed position, and a second coacting portion of said locking means attached to said free end of said second panel section, said locking portions being operable in conjunction with said clamp means for securing said composite panel in closed position.

14. In an engine enclosure as claimed in claim 13, further including handle means operatively mounted on said second panel section, lever means extending from said handle means to said second portion, and being operable to disengage the locking means in the respective lock portions, for disengagement of said locking means to permit a first pivoting motion of said second panel section to disengage said clamping means whereupon the composite access panel can be pivoted into open position in compound movement with said second panel section pivoting with respect to said first panel section, and said first panel section conjointly with said first panel section pivoting around said hinge mounting said composite unit.

* * * * *